P. OSWALD.
COIL WINDER.
APPLICATION FILED APR. 24, 1911.

1,002,435.

Patented Sept. 5, 1911.

Witnesses
L. B. James
O. B. Hopkins

Inventor
Peter Oswald
by H. B. Willson &co
Attorneys

UNITED STATES PATENT OFFICE.

PETER OSWALD, OF ALMA, NEBRASKA.

COIL-WINDER.

1,002,435.  Specification of Letters Patent.  Patented Sept. 5, 1911.

Application filed April 24, 1911. Serial No. 623,115.

*To all whom it may concern:*

Be it known that I, PETER OSWALD, a citizen of the United States, residing at Alma, in the county of Harlan and State of Nebraska, have invented certain new and useful Improvements in Coil-Winders; and I do declare the following to be a full, clear, and exact description of the invention, such as will enable others skilled in the art to which it appertains to make and use the same.

This invention relates to improvements in electric coil winding devices.

One object of the invention is to provide a coil winding device adapted to be operatively mounted in a portable box or casing which may also be employed for carrying other tools or instruments used in connection with electrical work.

With this and other objects in view, the invention consists of certain novel features of construction, combination and arrangement of parts as will be more fully described and particularly pointed out in the appended claims.

Figure 1:
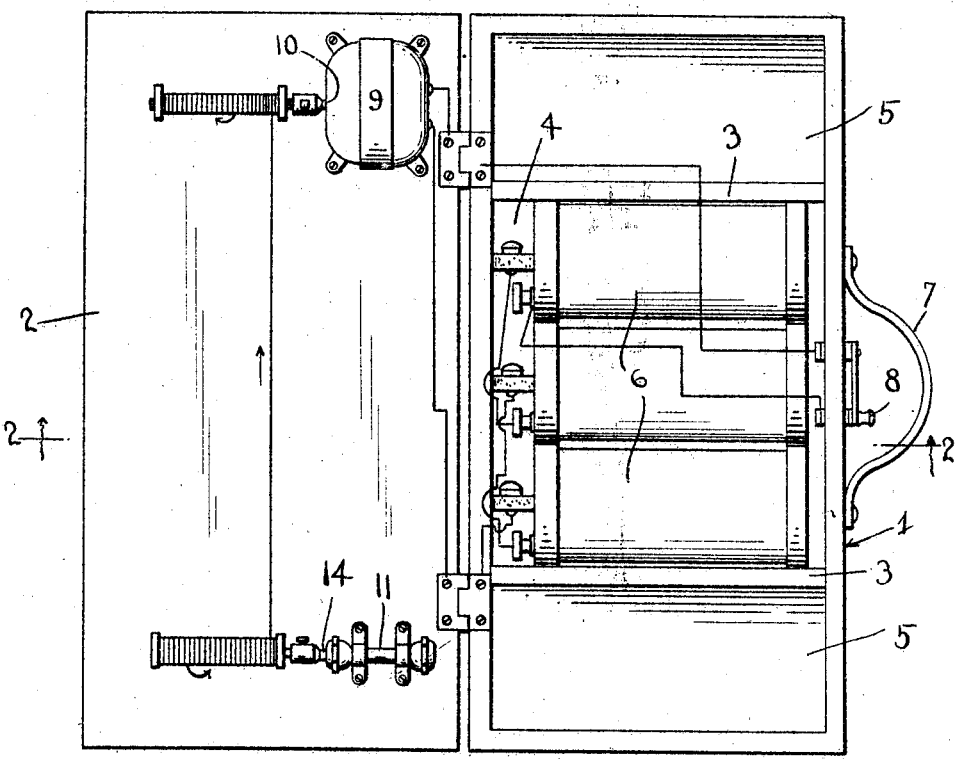
Figure 2:
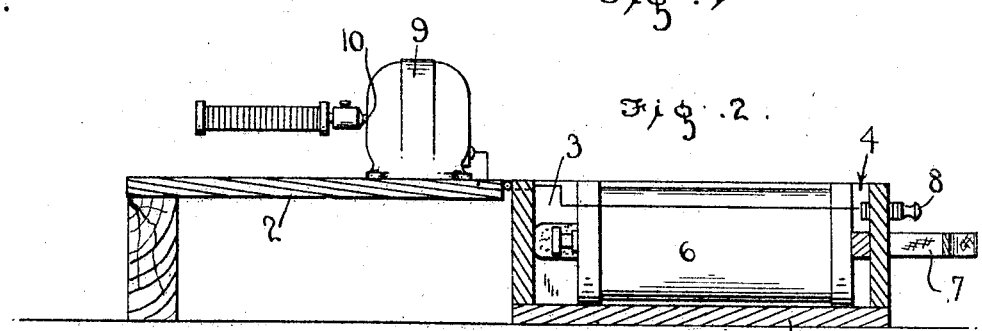
Figure 3:
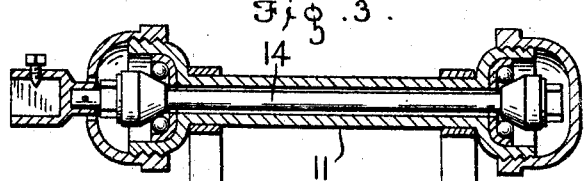

In the accompanying drawings: Figure 1 is a plan view of my improved coil winder showing the box or casing in open position; Fig. 2 is a vertical sectional view on the line 2—2 of Fig. 1. Fig. 3 is an enlarged sectional view through the spool holding sleeve.

In the embodiment of the invention, I provide a portable box or casing 1 which may be of any suitable size and shape and which is provided with a cover 2. The cover 2 is preferably hinged to the box as shown. The box 1 is divided by partitions 3 into a central compartment 4 and end compartments 5. In the central compartment 4 is arranged a battery comprising a plurality of dry cells 6, three of which are shown in the present instance. The box or casing is also provided with a handle 7 and a switch 8 is arranged on the box and connected with the current conducting wires from the batteries.

On the inner side of the cover of the box near one end is secured an electric motor 9 of the desired power and speed, said motor being connected with and operated by the battery cells 6. The shaft 10 of the motor is extended at one end and is adapted to receive chucks or other mechanical attachments and with which is adapted to be engaged the cores of the coils to be wound.

On the inner side of the cover 2 adjacent to its opposite end is arranged a bearing sleeve or cylinder 11 in which are arranged ball bearings. In the ball bearings of the sleeve or cylinder is revolubly mounted a coil supporting shaft 12 adapted to revolubly support the coil or spool from which the wire is being unwound and wound on the core attached to the motor shaft. If desired, the shaft 12 may also be constructed to receive chucks or other mechanical attachments.

By arranging the motor and the shaft 12 as herein shown and described, said parts will fit into the compartments at the opposite ends of the box when the cover is closed. In said end compartments may also be carried additional coils and such tools and instruments usually required in electrical or telephone work. It will be noted that the current from the battery wires in the box is conducted through the hinges to the wires connected to the motor.

From the foregoing description taken in connection with the accompanying drawings, the construction and operation of the invention will be readily understood without requiring a more extended explanation.

Various changes in the form, proportion and the minor details of construction may be resorted to without departing from the principles or sacrificing any of the advantages of this invention as defined and claimed.

Having thus described my invention, what I claim is:

A coil winder comprising a portable casing having therein a series of compartments, a battery arranged in one of said compartments, a cover adapted to close the casing, a motor arranged on the inner side of one end of the cover and connected to said battery, said motor having its shaft extended and adapted to receive tool chucks or a coil core whereby said chucks or core is revolved, a switch to control the current to said motor, a bearing sleeve secured to the inner side of the opposite end of the cover, and a shaft revolubly mounted in said sleeve and adapted to receive and revolubly support a coil or spool from which the wire is unwound and wound onto the core on said motor shaft, said motor and sleeve being arranged to fit into compartments in said box when the cover is closed.

In testimony whereof I have hereunto set my hand in presence of two subscribing witnesses.

PETER OSWALD.

Witnesses:
 F. H. STROUT,
 JEAN MCKEE.